(12) United States Patent
Jiang et al.

(10) Patent No.: US 10,200,248 B1
(45) Date of Patent: Feb. 5, 2019

(54) TRANSLATING HIGH-LEVEL CONFIGURATION INSTRUCTIONS TO LOW-LEVEL DEVICE CONFIGURATION

(71) Applicant: Juniper Networks, Inc., Sunnyvale, CA (US)

(72) Inventors: Tong Jiang, Fremont, CA (US); Sankar Ramamoorthi, San Jose, CA (US); Roshan Joyce, Bangalore (IN); Chandrasekhar A, Bangalore (IN); Nirmal Anburose, Bangalore (IN); Premchandar N, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 390 days.

(21) Appl. No.: 15/198,657

(22) Filed: Jun. 30, 2016

(51) Int. Cl.
*H04L 12/24* (2006.01)

(52) U.S. Cl.
CPC ...... *H04L 41/0889* (2013.01); *H04L 41/0859* (2013.01); *H04L 41/22* (2013.01)

(58) Field of Classification Search
CPC .. H04L 41/0889; H04L 41/0859; H04L 41/22
See application file for complete search history.

(56) References Cited

U.S. PATENT DOCUMENTS

| | | | |
|---|---|---|---|
| 6,973,488 B1 * | 12/2005 | Yavatkar | H04L 63/0263 709/223 |
| 8,402,147 B2 * | 3/2013 | Bondy | H04L 61/1588 370/400 |
| 9,576,092 B2 * | 2/2017 | Platzker | G06F 17/505 |
| 9,760,391 B2 * | 9/2017 | Kiess | G06F 9/5072 |
| 2005/0114479 A1 * | 5/2005 | Watson-Luke | G06F 8/71 709/220 |
| 2007/0113273 A1 * | 5/2007 | Shafer | G06Q 10/06 726/11 |
| 2016/0342722 A1 * | 11/2016 | Sentieys | G06F 15/7871 |

OTHER PUBLICATIONS

Enns, "NETCONF Configuration Protocol," RFC 4741, Network Working Group, Dec. 2006, 95 pp.
Bjorklund et al., "YANG—A Data Modeling Language for the Network Configuration Protocol (NETCONF)," RFC 6020, Internet Engineering Task Force (IETF), Oct. 2010, 173 pp.
Harrington et al., "An Architecture for Describing Simple Network Management Protocol (SNMP) Management Frameworks," RFC 3411, Network Working Group, Dec. 2002, 64 pp.

* cited by examiner

*Primary Examiner* — Arvin Eskandarnia
(74) *Attorney, Agent, or Firm* — Shumaker & Sieffert, P.A.

(57) ABSTRACT

In one example, a network management system (NMS) device manages a plurality of network devices including first and second network devices. Initially the first and second network devices are configured according to a first high-level configuration. The NMS is configured to determine a difference between the first high-level configuration and a second high-level configuration, apply a first transformation function, specific to the first network device, to the difference to generate a first low-level configuration change specific to the first device, apply a second transformation function, specific to the second network device, to the difference to generate a second low-level configuration change specific to the second device, configure the first device with the first low-level configuration change, and configure the second device with the second low-level configuration change.

19 Claims, 4 Drawing Sheets

TRANSLATING HIGH-LEVEL CONFIGURATION INSTRUCTIONS TO LOW-LEVEL DEVICE CONFIGURATION

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

In some cases, a network management system (NMS) device may manage multiple devices of different types, e.g., from different vendors. Vendors often provide different protocols for managing similar types of devices. For example, different vendors of routers may offer different protocols for configuring services performed by the routers. Typically, the NMS device will be configured with specific configuration schemas (e.g., specified in YANG) for devices to be managed from each of the vendors.

The NMS device may also classify changes to device configuration data in different ways. For example, when device configuration data is changed from a current version to a new version, the NMS device may classify the changes as additions, updates, or deletions. That is, additions represent new sets of configuration data, relative to the current version. Updates represent updated values for existing elements of the current configuration data. Deletions represent removals of configuration data from the current configuration data. The NMS device may process additions, updates, and deletions in different ways, e.g., using different translation functions.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. In order to configure devices to perform the services, a user (such as an administrator) may write translation programs that translate high-level configuration instructions (e.g., instructions according to a network service model) to low-level configuration instructions (e.g., instructions according to a device configuration model). As part of configuration service support, the user/administrator may provide a service model and a mapping between the service model to a device configuration model.

In order to simplify the mapping definition for the user, NMS devices may be designed to provide the capability to define the mappings in a simple way. For example, some NMS devices provide the use of Velocity Templates and/or Extensible Stylesheet Language Transformations (XSLT). Such translators contain the translation or mapping logic from the high-level service model to the low-level device configuration model. Typically, a relatively small number of changes in the high-level service model impact a relatively large number of properties across device configurations. Different translators may be used when services are created, updated, and deleted from the high-level service model.

SUMMARY

In general, this disclosure describes techniques for managing multiple network devices having different configuration protocols, e.g., similar devices from different vendors, In particular, these techniques allow a network management system (NMS) device to manage multiple such devices without requiring that the managed devices support a structured schema, such as YANG. Moreover, the NMS device allows a user, such as an administrator, to configure the managed devices without requiring the user to separately manage devices having different configuration protocols (e.g., devices from different vendors). Instead, the user can supply a single input configuration, which the NMS device translates into low-level device configuration information for each of the devices, based on device-specific configuration protocols. In particular, the NMS device is configured with translation functions that translate high-level configuration instructions to low-level (i.e., device-specific) device configuration instructions for each managed device of each type.

In one example, a method is performed by a network management system (NMS) device that manages a plurality of network devices, including a first network device and a second network device configured according to a first high-level configuration. The method includes receiving a second high-level configuration for at least the first network device and the second network device, determining a difference between the first high-level configuration and the second high-level configuration, applying a first transformation function, specific to the first network device, to the difference between the first high-level configuration and the second high-level configuration to generate a first low-level configuration change specific to the first device, applying a second transformation function, specific to the second network device, to the difference between the first high-level configuration and the second high-level configuration to generate a second low-level configuration change specific to the second device, configuring the first device with the first low-level configuration change, and configuring the second device with the second low-level configuration change.

In another example, a network management system (NMS) device manages a plurality of network devices, including a first network device and a second network device configured according to a first high-level configuration. The NMS device includes an interface configured to receive a second high-level configuration for at least the first network device and the second network device. The NMS device also includes one or more network interfaces communicatively coupled to the plurality of network devices.

The NMS device further includes one or more hardware-based processors, implemented using discrete logic circuitry, configured to determine a difference between the first high-level configuration and the second high-level configuration, apply a first transformation function, specific to the first network device, to the difference between the first high-level configuration and the second high-level configuration to generate a first low-level configuration change specific to the first device, apply a second transformation function, specific to the second network device, to the difference between the first high-level configuration and the second high-level configuration to generate a second low-level configuration change specific to the second device, configure the first device with the first low-level configuration change via the one or more network interfaces, and configure the second device with the second low-level configuration change via the one or more network interfaces.

In another example, a system includes a plurality of network devices, and a network management system (NMS) device that manages the plurality of network devices, including a first network device and a second network device configured according to a first high-level configuration. The NMS device includes an interface configured to receive a second high-level configuration for at least the first network device and the second network device. The NMS device also includes one or more network interfaces communicatively coupled to the plurality of network devices. The NMS device further includes one or more hardware-based processors, implemented using discrete logic circuitry, configured to determine a difference between the first high-level configuration and the second high-level configuration, apply a first transformation function, specific to the first network device, to the difference between the first high-level configuration and the second high-level configuration to generate a first low-level configuration change specific to the first device, apply a second transformation function, specific to the second network device, to the difference between the first high-level configuration and the second high-level configuration to generate a second low-level configuration change specific to the second device, configure the first device with the first low-level configuration change via the one or more network interfaces, and configure the second device with the second low-level configuration change via the one or more network interfaces.

In another example, a computer-readable storage medium has stored thereon instructions that, when executed, cause a processor of a network management system (NMS) device that manages a plurality of network devices, including a first network device and a second network device configured according to a first high-level configuration, to receive a second high-level configuration for at least the first network device and the second network device, determine a difference between the first high-level configuration and the second high-level configuration, apply a first transformation function, specific to the first network device, to the difference between the first high-level configuration and the second high-level configuration to generate a first low-level configuration change specific to the first device, apply a second transformation function, specific to the second network device, to the difference between the first high-level configuration and the second high-level configuration to generate a second low-level configuration change specific to the second device, configure the first device with the first low-level configuration change, and configure the second device with the second low-level configuration change.

The details of one or more examples are set forth in the accompanying drawings and the description below. Other features, objects, and advantages will be apparent from the description and drawings, and from the claims.

DETAILED DESCRIPTION

Figure 1:
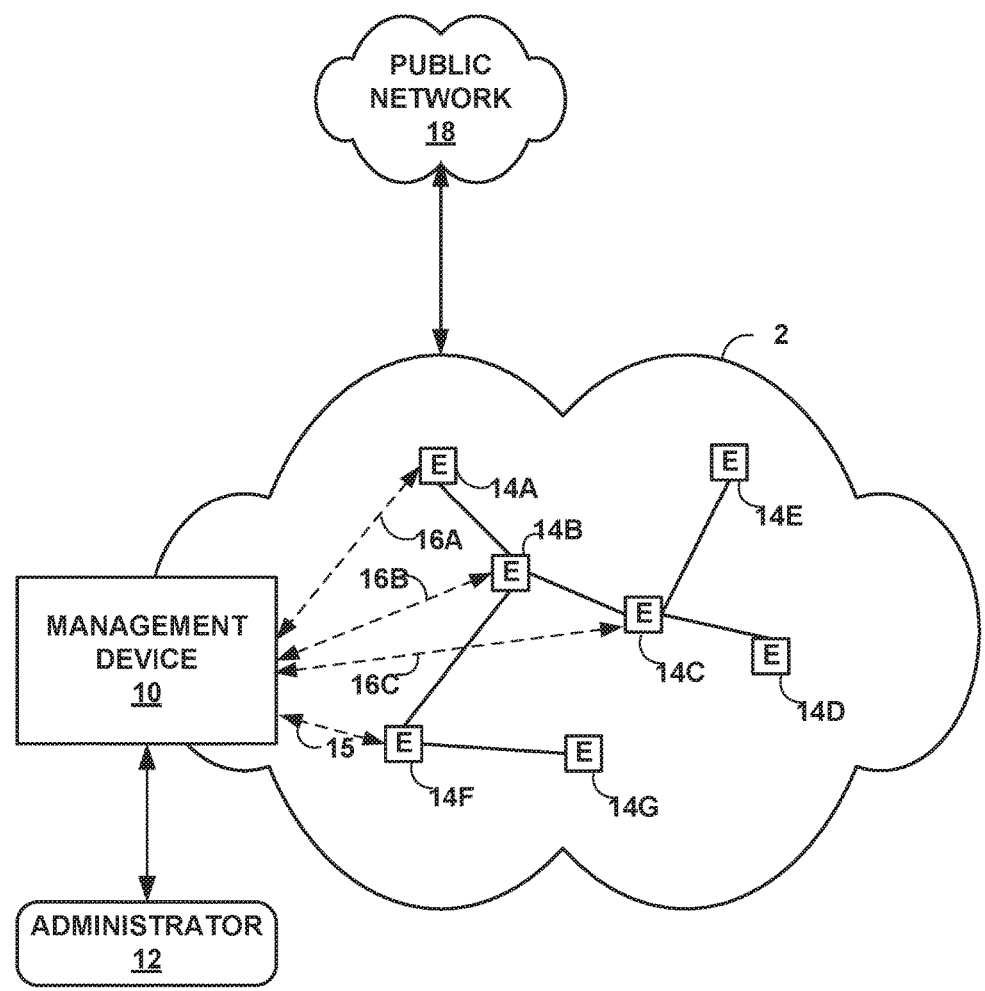
FIG. 1 is a block diagram illustrating an example including elements of an enterprise network that are managed using a management device.

FIG. 1 is a block diagram illustrating an example including elements of an enterprise network 2 that are managed using a management device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Management device 10 is communicatively coupled to elements 14 via enterprise network 2. Management device 10, in some examples, forms part of a device management system, although only one device of the device management system is illustrated for purpose of example in FIG. 1. Management device 10 may be coupled either directly or indirectly to the various elements 14. Once elements 14 are deployed and activated, administrator 12 uses management device 10 to manage the network devices using a device management protocol. One example device protocol is the Simple Network Management Protocol (SNMP) that allows management device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietforg/html/rfc3411, the entire contents of which are incorporated herein by reference.

In common practice, management device 10, also referred to as network management system (NMS) or NMS device, and elements 14 are centrally maintained by an IT group of the enterprise. Administrator 12 interacts with management device 10 to remotely monitor and configure elements 14. For example, administrator 12 may receive alerts from management device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses management device 10 or a local workstation to interact directly with elements 14, e.g., through telnet, secure shell (SSH), or other such communication sessions. That is, elements 14 generally provide interfaces for direct interaction, such as command line interfaces (CDs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using management device 10, to directly, configure element 14F. In this manner, a user can provide commands in a format for execution directly to elements 14.

Further, administrator 12 can also create scripts that can be submitted by management device 10 to any or all of elements 14. For example, in addition to a CLI interface, elements 14 also provide interfaces for receiving scripts that specify the commands in accordance with a scripting language. In a sense, the scripts may be output by management device 10 to automatically invoke corresponding remote procedure calls (RPCs) on the managed elements 14. The scripts may conform to, e.g., extensible markup language (XML) or another data description language.

Administrator 12 uses management device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Management device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Management device 10 may establish NETCONF sessions with one or more of elements 14.

In general, elements 14 may generally provide similar services. For example, each of elements 14 (or a subset thereof) may be a router. However, different ones of elements 14 may have different configuration information. For example, element 14A may represent a router provided by a first vendor, and element 14B may represent a router provided by a second, different vendor. In accordance with the techniques of this disclosure, administrator 12 interacts with management device 10 to configure both element 14A and 14B in the same way, e.g., by providing a single set of high-level configuration information for elements 14A and 14B. However, management device 10 may translate the high-level configuration information into distinct sets of low-level configuration information specific to elements 14A and 14B.

In accordance with the techniques of this disclosure, management device 10 is configured with multiple translation functions that translate high-level configuration instructions into distinct sets of low-level configuration instructions, for each type of managed device. For example, in accordance with the scenario above in which elements 14A and 14B are provided by different vendors, management device 10 would include different translation functions for elements 14A and 14B, respectively. Thus, administrator 12 may provide a single set of high-level configuration data for elements 14A and 14B, and management device 10 would separately translate the high-level configuration data for elements 14A and 14B according to the respective translation functions.

Moreover, management device 10 is specifically configured to compare a new set of high-level configuration data to an existing (or old) set of high-level configuration data, and apply the translation functions to the differences between the new and old high-level configuration data. In particular, management device 10 determines whether the new set of configuration data includes any additional configuration parameters relative to the old set of high-level configuration data, as well as whether the new set of configuration data omits any configuration parameters that were included in the old old set of high-level configuration data.

Expressed another way, let the number of types of managed devices (e.g., types of elements 14) be represented by N, let the variable y represent low-level, device-specific configuration data, and let the variable x represent high-level configuration data. Management device 10 includes N translation functions $f_1(\ )$, $f_2(\ )$, ... $f_N(\ )$. These functions are configured accept the high-level configuration data (which may be expressed as structured input parameters, e.g., according to YANG, which is described in Bjorklund "YANG—A Data Modeling Language for the Network Configuration Protocol (NETCONF)," Internet Engineering Task Force, RFC, 6020, October 2010, available at tools.ietf.org/html/rfc6020). The functions are also configured to output respective sets of low-level device configuration data changes, e.g., device configuration additions and removals. That is, $y_1=f_1(x)$, $y_2=f_2(x)$, ... $y_N=f_N(x)$.

Furthermore, management device 10 is configured to calculate differences between current high-level configuration data for the managed devices and new high-level configuration data for the managed devices. Let $x_0$ represent the current high-level configuration data, and $x_1$ represent the new high-level configuration data. Then let $\Delta x=x1-x0$, such that $\Delta x$ represents the differences between the old high-level configuration data and the new high-level configuration data. Accordingly, in response to receiving new high-level configuration data $x_1$, management device 10 may be configured to perform the following:

calculate $\Delta x$ as $x_1 - x_0$ determine $y_1 = f_1(\Delta x)$, and configure type 1 devices using $y_1$ determine $y_2 = f_2(\Delta x)$, and configure type 2 devices using $y_2$

. . .

determine $y_N = f_N(\Delta x)$, and configure type N devices using $y_N$

In some examples, management device 10 further distinguishes additions in $x_1$ relative to $x_0$ from removals from $x_0$ relative to $x_1$. Let additions be represented by $\Delta x_+$ and removals be represented by $\Delta x_-$. Moreover, management device 10 may include particular translation functions for additions and removals. Let $f_i()$ represent the translation function for device type i (ranging from 1 to N) for processing removals, and $f_i()_+$ represent the translation function for device type i for processing additions. Thus, management device 10 may be configured to perform the following:

calculate $\Delta x$ as $x_1 - x_0$ determine additions in $\Delta x$ as $\Delta x_+$ and removals as $\Delta x_-$.

determine $y_1 = f_1(\Delta x_-)_- + f_1(\Delta x_+)_+$, and configure type 1 devices using $y_1$ determine $y_2 = f_2(\Delta x_-)_- + f_2(\Delta x_+)_+$, and configure type 2 devices using $y_2$

. . .

determine $y_N = f_N(\Delta x_-)_- + f_N(\Delta x_+)_+$, and configure type N devices using $y_N$ In the examples above, the high-level configuration data may be expressed as a structured set of parameters, such as YANG. However, elements 14 need not support YANG or other structured input schemas. Instead, the translation functions are configured to translate the input high-level configuration data into instructions needed by the corresponding devices. In this manner, management device 10 is able to manage similar devices of different types using a common high-level input device configuration (that is, common to each of the devices) received from, e.g., administrator 12.

In addition, or in the alternative, management device 10 may use an intelligent service transformer to translate differences between current high-level configuration data and new high-level configuration data for some or all of elements 14. In particular, the intelligent service transformer may allow use of the same template to address additions, updates, and deletions in the new high-level configuration data relative to the current high-level configuration data. The intelligent service transformer may simply process impacted high level configuration data changes, e.g., without processing high-level configuration data that has not been impacted. Based on the translator logic, management device 10 may infer dependencies across high layer model (HLM) elements in the high-level model corresponding to low-layer model (LLM) elements. When the high level data is changed, management device 10 generates a set of differences, based on these dependencies. Management device 10 further determines information required to process the differences, such as the dependencies. Management device 10 then executes the intelligent service transformer, passing the intelligent service transformer the differences and the information required to process the differences (e.g., the dependencies).

Figure 2:
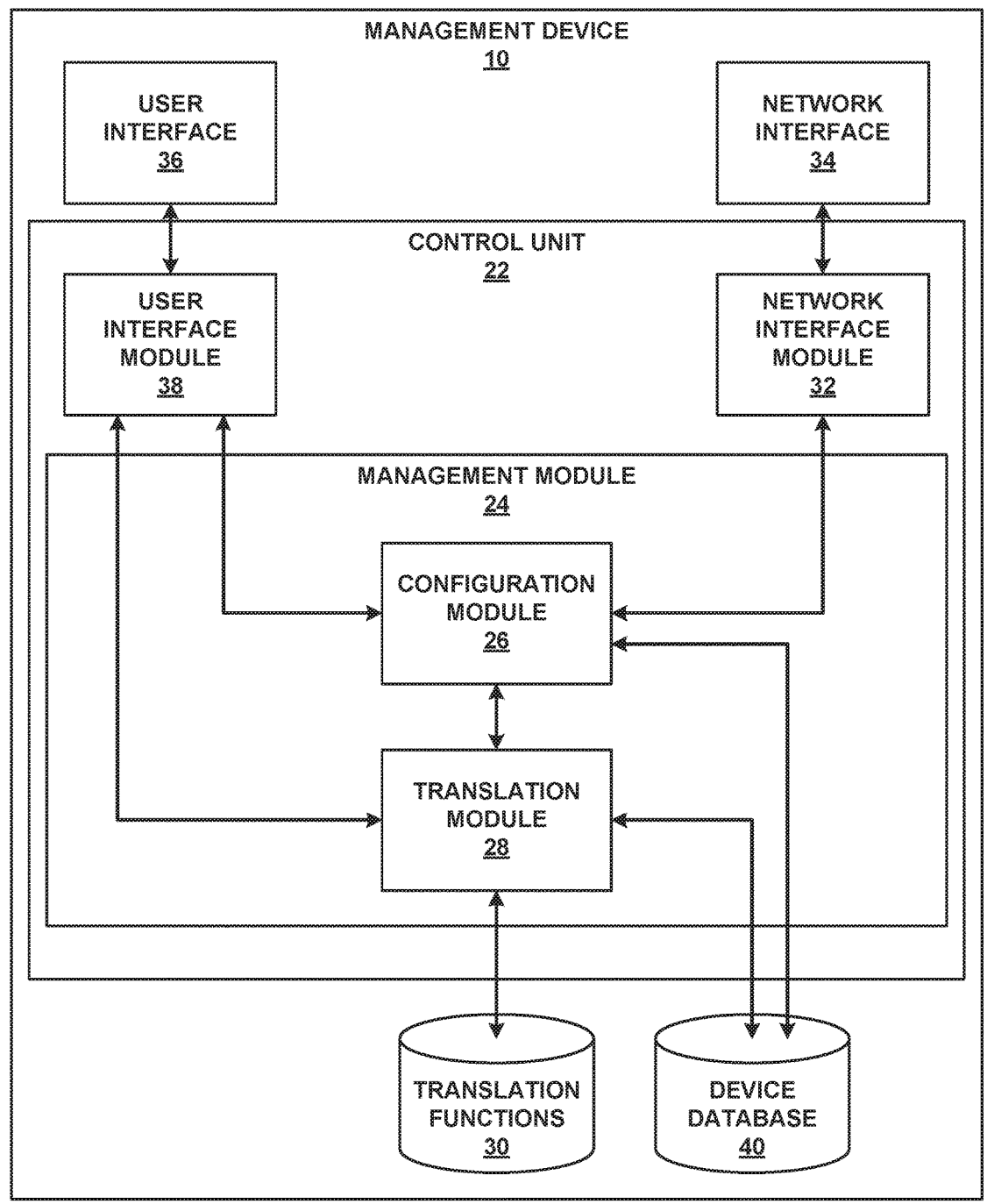
FIG. 2 is a block diagram illustrating an example set of components for the management device of FIG. 1.

FIG. 2 is a block diagram illustrating an example set of components for management device 10 of FIG. 1. In this example, management device 10 includes control unit 22, network interface 34, and user interface 36. Network interface 34 represents an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11a/b/g/n or other such wireless protocols). Management device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with management device 10, e.g., to provide input and receive output. For example, user interface 36 may represent one or more of a monitor, keyboard, mouse, touchscreen, touchpad, trackpad, speakers, camera, microphone, or the like. Furthermore, although in this example management device 10 includes a user interface, it should be understood that administrator 12 need not directly interact with management device 10, but instead may access management device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive high-level configuration instructions for a set of managed network devices from a user, such as administrator 12. Over time, the user may update the configuration instructions, e.g., to add new services, remove existing services, or modify existing services performed by the managed devices. The high-level instructions may be structured according to, e.g., YANG. In some examples, management module 24 also provides the user with the ability to submit translation functions that translation module 28 executes to transform high-level configuration instructions to device-specific, low-level configuration instructions, as discussed below.

Management device 10 also includes device database 40. Device database 40 generally includes information describing managed network devices, e.g., elements 14. For example, device database 40 may include information indicating device identifiers (such as MAC and/or IP addresses), device type, device vendor, devices species (e.g., router, switch, bridge, hub, etc.), or the like. Device database 40 also stores current configuration information (e.g., high-level configuration information, or in some cases, both high-level configuration and low-level configuration information) for the managed devices (e.g., elements 14).

In accordance with the techniques of this disclosure, management device 10 includes a memory storing a variety of different translation functions 30. In particular, translation functions 30 represent different translation functions for different services performed by managed network devices. For example, translation functions 30 may include one translation function for each vendor of each device that performs a particular service. As one example, translation functions 30 may include translation functions for each of four services performed by devices from each of three vendors that provide the devices. Thus, assuming three vendors provide devices that perform four services, there would be a total of twelve translation functions (three venders multiplied by four services).

In this manner, the user may submit high-level configuration instructions to management device 10 via, e.g., user interface 36. Control unit 22 receives the instructions via user interface module 38, which passes the instructions to configuration module 26 of management module 24. Configuration module 26 submits the high-level configuration instructions to translation module 28, to be translated into low-level, device-specific configuration instructions.

Translation module 28 determines which devices are managed, as well as vendors for the devices, using device database 40. Translation module 28 determines which of translation functions 30 to execute on the high-level configuration instructions based on the information of device database 40, e.g., which of the devices are to receive the low-level configuration instructions and vendors of the devices that are to receive the low-level configuration instructions. That is, device database 40 indicates high level service types for each of the devices. Translation module 28 then executes each of the determined translation functions of translation functions 30, providing the high-level configuration instructions to the translation functions as input and receiving separate sets of low-level configuration instructions (i.e., distinct sets for different vendors of the managed network devices to be configured).

In particular, configuration module 26 may first determine an existing set of high-level configuration information for each service performed by the devices for which configuration is to be updated, e.g., by retrieving the existing set of high-level configuration information for each of the services from device database 40. Configuration module 26 may then compare the existing set of high-level configuration information to the newly received set of high-level configuration information, and determine differences between the existing and newly received sets of high-level configuration information. Configuration module 26 may then pass these differences to translation module 28, for translation into respective sets of low-level configuration information. Configuration module 26 also updated the existing high-level configuration information recorded in device database 40 based on the newly, received set of high-level configuration information.

As an example of operation, an input parameter schema may be as follows:

```
container fw_policy {
    csp:op-set "iptable-set-fw-policy.j2"
    csp:op-unset "iptable-set-fw-policy.j2"
    leaf allow_outgoing_ssh {
        type boolean;
    }
    list address {
        key name;
        leaf name {
            type string;
        }
        leaf-list ip_prefixes {
            type string;
        }
    }
    list fw_rule {
        key id;
        leaf id {
            type string;
        }
        leaf type {
            type enumeration {
                enum INPUT;
                enum FORWARD;
                enum OUTPUT;
            }
        }
        leaf src_addr {
            type leafref { path "../../address/name"; }
        }
        leaf dst_addr {
            type leafref { path "../../address/name"; }
        }
        leaf service {
            type string;
        }
        leaf action {
            type enumeration {
                enum ACCEPT;
                enum DROP;
                enum REJECT;
            }
        }
    }
}
```

The following high-level configuration (referred to below as $X_0$) represents an example current high-level configuration:

```
{
    "ct-iptable-fw:fw-policy" : {
        "allow_outgoing_ ssh": "true",
        "address": [
            {
                "name": "any",
                "ip_prefixes": [
                    "0.0.0.0/0"
                ]
            },
            {
                "name": "porn-sites",
                "ip_prefixes" : [
                    "10.1.1.0/24",
                    "20,1.1.0/24",
                    "30.1.1.254"
                ]
            },
            {
                "name": "corp-web-sites",
                "ip_prefixes": [
                    "192.168.1.1",
                    "172.10.12.13"
                ]
```

-continued

```
      }
    ],
    "fw_rule": [
      {
        "id": "block-porns",
        "src_addr": "any",
        "dst_addr": "porn-sites",
        "service": "any",
        "action": "DROP"
      },
      {
        "id": "allow-corp-sites",
        "src_addr": "any",
        "dst_addr": "corp-web-sites",
        "service": "http",
        "action": "ACCEPT"
      },
      {
        "id": "default-rule",
        "src_addr": "any",
        "dst_addr": "any",
        "service": "anyp",
        "action": "DROP"
      }
    ]
  }
}
```

The following high-level configuration (referred to below as $X_1$) represents an example new high-level configuration (with additions and modifications, compared to $X_0$, emphasized using italicized text, not showing removals relative to $X_0$):

```
{
  "ct-iptable-fw:fw-policy" : {
    "allow_outgoing_ssh": "false",
    "address": [
      {
        "name": "any",
        "ip_prefixes": [
          "0.0.0.0/0"
        ]
      },
      {
        "name": "corp-web-sites",
        "ip_prefixes": [
          "192.168.1.1",
          "172.10,12.13"
        ]
      },
      {
        "name": "public-web-sites",
        "ip_prefixes": [
          "100.1.1.0/24",
          "200.1.1.0/24"
        ]
      }
    ],
    "fw_rule": [
      {
        "id": "allow-corp-sites",
        "src_addr": "any",
        "dst_addr": "corp-web-sites",
        "service": "http",
        "action": "ACCEPT"
      },
      {
        "id": "allow-public-sites",
        "src_addr": "any",
        "dst_addr": "public-web-sites",
        "service": "http",
        "action": "ACCEPT"
      },
      {
        "id": "default-rule",
        "src_addr": "any",
        "dst_addr": "any",
        "service": "anyp",
        "action: "DROP"
      }
    ]
  }
}
```

The following is an example of data representing differences between $X_0$ and $X_1$, which may be generated by translation module 28:

```
{
  "ct-iptable-fw:fw-policy" : {
    "allow_outgoing_ssh": "false",
    "address": [
      {
        "@operation": "remove",
        "name": "porn-sites",
        "ip_preftxes" : [
          "10.1.1.0/24",
          "20.1.1.0/24",
          "30.1.1.254"
        ]
      },
      {
        "@operation": "append",
        "name": "public-web-sites",
        "ip_preftxes": [
          "100.1.1,0/24",
          "200.1.1.0/24"
        ]
      }
    ],
    "fw_rule": [
      {
        "@operation": "remove",
        "id": "block-porns",
        "src_addr": "any",
        "dst_addr": "porn-sites",
        "service": "any",
        "action": "DROP"
      },
      {
        "@operation": "insert-before",
        "@key": "default-rule",
        "id": "allow-corp-sites",
        "src_addr": "any",
        "dst_addr": "corp-web-sites",
        "service": "http",
        "action": "ACCEPT"
      },
    }
  }
}
```

Translation module 28 may apply various translations functions of translation functions 30 to this difference data, where translation module 28 selects the translation functions to be applied based on, e.g., vendors that provided the devices to be configured. As a result of application of the translation functions, translation module 28 may generate the following sets of low-level configuration data, which indicate data to be added and data to be removed from corresponding managed devices (e.g., certain elements of elements 14 of FIG. 1).

The following represents an example translation function for processing low-level configuration information to be added, per the example above:

```
{%- for rule in delta_policy.fw_rule %}
  {%- set src_addr = resolve_ref(rule.src_addr) %}
  {%- set dst_addr = resolve_ref(rule.dst_addr) %}
  {%- for src_ip_prefix in src_addr.ip_prefixes %}
    {%- for dst_ip_prefix in dst_addr.dst_ip_prefixes %}
      {%- if rule['@operation'] == 'append' %}
        iptables -A FORWARD {% if rule.service != 'any' %}
        -p tcp --dport
          {{ rule.service }} {% endif %} -s {{ src_ip_prefix }}
          -d
          {{dst_ip_prefixes}} -m comment --comment
          "{{ rule.name }}"
          -j {{ rule.action
      {% elif ruler['@operation'] == 'insert-before' %}
        rule_num='iptables -L FORWARD --line-num | grep
        "{{ rule.name }}"
          |cut -b 0-5'
        iptables -I FORWARD ${rule_num} {% if rule.service !=
        'any' %} -p
          tcp --dport {{ rule.service }} {% endif %} -s
          {{ src_ip_prefix }} -d
          {{ dst_ip_prefixes }} -m comment --comment
          "{{ rule.name }}" -j
          {{ rule.action }}"
      {% endif %}
    {% endfor %}
  {% endfor %}
{%- endfor %}
```

The following represents an example translation function for processing low-level configuration information to be removed, per the example above:

```
{%- for rule in delta_policy.fw_rule %}
  {%- set src_addr = resolve_ref(rule.src_addr) %}
  {%- set dst_addr = resolve_ref(rule.dst_addr) %}
  {%- for src_ip_prefix in src_addr.ip_prefixes %}
    {%- for dst_ip_prefix in dst_addr.dst_ip_prefixes %}
      {%- if rule['@operation'] == 'delete' %}
        iptables -D FORWARD {% if rule.service != 'any' %}
        -p tcp --dport
          {{ rule.service }} {% endif%} -s {{src_ip_prefix}}
          -d
          {{ dst_ip_prefixes }} -m comment --comment
          "{{ rule.name }}"
          -j {{ rule.action
      {% endif %}
    {% endfor %}
  {% endfor %}
{% endfor %}
```

In accordance with the example above, the following represents example existing low-level configuration of one or more of elements 14 (i.e., low-level configuration based on $X_0$ above, the original high-level configuration information):

| | Chain FORWARD (policy ACCEPT) | | | | | |
|---|---|---|---|---|---|---|
| num | target | prot | opt | source | destination | |
| 1 | DROP | all | — | anywhere | 10.1.1.0/24 | /* block-porns */ |
| 2 | DROP | all | — | anywhere | 20.1.1.0/24 | /* block-porns */ |
| 3 | DROP | all | — | anywhere | 30.1.1.0/24 | /* block-porns */ |
| 4 | ACCEPT | all | — | anywhere | 192.168.1.1 | /* allow-corp-sites */ |
| 5 | ACCEPT | all | — | anywhere | 172.10.12.13 | /* allow-corp-sites */ |
| 6 | DROP | all | — | anywhere | 10.1.1.0/24 | /* default-rule */ |

In accordance with the example above, the following represents example changes to be applied to the existing low-level configuration information, which may be generated by translation module 28 and applied to elements 14 by configuration module 26:

1. iptables-D FORWARD-s 0.0.0.0/0-d 10.1.1.0/24-m comment—comment "block-porns"-j DROP
2. iptables-D FORWARD-s 0.0.0.0/0-d 20.1.1.0/24-m comment—comment "block-porns"-j DROP
3. iptables-D FORWARD-s 0.0.0.0/0-d 30.1.1.0/24-m comment—comment "block-porns"-j DROP
4. rule_num='iptables-L FORWARD—line-num|grep "{{rule.name}}"|cut-b 0-5'
5. iptables-I FORWARD ${rule_num}-s 0.0.0.0/0-d 100.1.1.0/24-m comment—comment "allow-public-sites"-j ACCEPT
6. rule_num='iptables-L FORWARD—line-num grep|"{{rule.name}}"|cut-b 0-5'
7. iptables-I FORWARD ${rule_num}-s 0.0.0.0/0 d 200.1.1.0/24-m comment—comment "allow-public-sites"-j ACCEPT Thus, the resulting low-level configuration after translation module 28 applies the above changes to the corresponding elements of elements 14 would be as follows, in this example:

| | Chain FORWARD (policy ACCEPT) | | | | | |
|---|---|---|---|---|---|---|
| num | target | prot | opt | source | destination | |
| 1 | ACCEPT | all | — | anywhere | 200.1.1.0/24 | /* allow-public-sites */ |
| 2 | ACCEPT | all | — | anywhere | 100.1.1.0/24 | /* allow-public-sites */ |
| 3 | ACCEPT | all | — | anywhere | 192.168.1.1 | /* allow-corp-sites */ |
| 4 | ACCEPT | all | — | anywhere | 172.10.12.13 | /* allow-corp-sites */ |
| 5 | DROP | all | — | anywhere | 10.1.1.0/24 | /* default-rule */ |

This disclosure further recognizes that translation from high-level configuration information to low-level information should be processed quickly. For example, if management device 10 is being used in multiple user mode, conflicts between high-level configuration information from different users should be detected as soon as changes are made. In the case of automated systems, changes should be pushed to managed devices, e.g., elements 14, as soon as possible.

As discussed above, a user, such as administrator 12, may create different translators for data creation, data updates, and data deletions. This disclosure describes translation techniques based on an appreciation that an "update translator" needs to check modified variables in the high-level configuration information, and update the corresponding configuration in the low-level configuration model(s). When updating the low-level configuration information, the translator should not only rely on the high-level difference data, because unchanged data of the high-level configuration data may need to be read to properly change the low-level configuration data. Thus, the techniques of this disclosure may simplify update and/or delete translators for translating high-level configuration data to low-level configuration data. In some examples, the "create" translator may be used to perform update and/or deletion translations as discussed below.

In accordance with certain examples of the techniques of this disclosure, translation functions 30 that perform update translations (that is, translating changes in high-level configuration data that results in updates to values of low-level configuration information, without creation or deletion of elements in the low-level configuration data) may operate as follows. In one example, the translation functions 30 that perform updates may override single elements. That is, performance of these translation functions may result in deletion of an element value, e.g., by replacing an old element value with a new value. Sometimes, a single value in a configuration service model can be mapped to a list in a device configuration. In these cases, translation module 28 may send the old value as well as the new value.

For example, a leaf element in a high-level model (HLM) may be mapped to a list of elements in a low-level model (LLM) for device-level configuration information. Suppose the HLM element has the name "VLAN name" but in LLM, the corresponding element is named "list." If a user modifies the HLM object by replacing the name "VLAN name" with a new name (e.g., "new VLAN name"), the translation function would need to delete "VLAN name," otherwise a stale entry would be retained in the lower-level configuration information. Moreover, translation functions 30 that perform updates may cause translation module 28 to update lists by adding new entries as needed, and deleting old entries.

In accordance with the techniques of this disclosure, translation module 28 (which may be configured according to translation functions 30) may use the same translation template for creation, updates, and deletion of high-level configuration instructions. Translation module 28 may be configured to allow processing of only impacted high level data changes (i.e., those elements in the high-level configuration information that are impacted by the changes). Based on the translator logic, translation module 28 may infer dependencies across HLM elements in the high-level model, and the corresponding LLM elements. When the high-level configuration information is changed, translation module 28 may generate a difference between existing high-level configuration information and new high-level configuration information. This difference may account for the dependencies in the LLM elements. Thus, when calculating the difference, translation module 28 may determine the difference as well as information used to process the difference, e.g., based on the dependencies. Translation module 28 may execute one of translation functions 30, providing the determined information (differences and dependencies) to the executed one of translation functions 30 as input.

When a "create" template is uploaded (that is, a translation function of translation functions 30 that processes new data in high-level configuration information, relative to existing high-level configuration information), translation module 28 may determine the dependencies across elements within the high-level configuration information. These dependencies may be based on service-to-device configuration mappings. When the service is changed, translation module 28 may generate a difference between the existing high-level configuration information and the new high-level configuration information, based on the dependencies. Translation module 28 may then use the "create" template (the translation function of translation functions 30) to process the difference.

In particular, translation module 28 may perform the following algorithm to translate high-level configuration information to low-level configuration information, e.g., for a plurality of different devices. One or more of translation functions 30 may generally conform to a format resembling the example below. The example template format contains mappings from a service model (i.e., high-level configuration information) to a device model (i.e., low level configuration information). Different translation functions may be provided for each type of device (e.g., devices available from different vendors).

```
<template>
  <device>
    <device-id>{/service/devices/device/device-id}</device-id>
    <configuration>
      <interfaces loop-context="interface">
        <interface>
          <name>{name}</name>
          <flexible-vlan-tagging/>
          <mtu>{/service/connectivity-settings/mtu</mtu>
          <encapsulation>{/service/connectivity-
          settings/physical-if-
             encapsulation}<encapsulation>
        </interface>
      </interfaces>
      <protocols>
        <l2circuit>
          <neighbor>
            <name>{neighbour-name}</name>
            <interface loop-context="interface">
              <name>{name}</name>
              <virtual-circuit-id>{/service/connectivity-settings/
              vc-id}</virtual-
                 circuit-id>
              <no-control-word/>
              <ignore-encapsulation-mismatch/>
            </interface>
          </neighbor>
        </l2circuit>
      </protocols>
    </configuration>
  </device>
</template>
```

A corresponding input YANG file is shown below, referred to as an HLM YANG. An example low-level model, resulting from translation, is shown below and referred to as Junos YANG. However, it should be understood that other translations may be applied, such that the low-level configuration information need not necessarily conform to a structured input, such as YANG.

HLM YANG:

```
module: service
  +--rw- service* [name]
     +--rw name                    string
     +--rw connectivity-settings
     |  +--rw name?                                string
     |  +--rw vc-id?                uint32
     |  +--rw mtu?                  uint32
     |  +--rw physical-if-encapsulation?                string
     |  +--rw logical-if-encapsulation?                 string
     |  +--rw traffic-type?                        string
     |  +--rw unit-id?              uint32
     |  +--rw vlan-id?              uint32
     +--rw bandwidth-settings
     |  +--rw bandwidth-limit?                     uint32
     |  +--rw burstsize-limit?      uint32
     +--rw devices
        +--rw device* [device-id]
           +--rw device-id          string
           +--rw neighbour-name?                  string
           +--rw interface* [name]
              +--rw name            string
```

Junos YANG:

```
module: configuration
  +--rw- configuration
     +--rw interfaces
     |  +--rw interface* [name]
     |  +--rw name                  string
     |  +--rw flexible-vlan-tagging?    empty
     |  +--rw mtu?                  uint32
     |  +--rw encapsulation?        enumeration
     +--rw protocols
        +--rw l2circuit
           +--rw- neighbor*
              +--rw name?     string
              +--rw interface* [name]
                 +--rw name                        interface-name
                 +--rw virtual-circuit-id          uint32
                 +--rw no-control-word?            empty
                 +--rw ignore-encapsulation-mismatch?   empty
```

As discussed above, translation module 28 may be configured to translate high-level configuration information to low-level configuration information based on dependencies. An example method by which translation module 28 may determine dependencies (that is, dependencies of elements in the low-level configuration on data of the high-level configuration information) is discussed below. To generate data describing such dependencies, translation module 28 may receive a template file and generate a dependency map as output. In this example, dependencies are maintained in a hashmap data structure. In this example, a key is on the "HLM xpath," which is used as a key in the LLM model. A value to which each key is mapped is a list of "HLM xpaths" that are dependent on the corresponding "key path."

A first step in determining the dependencies is that translation module 28 resolves leaf references between the high-level configuration model (that is, the HLM), the low-level configuration model (that is, the LLM), and the template used to convert high-level configuration information according to the HLM to low-level configuration information according to the LLM. A device configuration model may contain the leaf references. Translation module 28 may resolve these leaf references before building the dependency map. To resolve the leaf references, translation module 28 may, for each element in the corresponding translation function (also referred to as "template XML"), determine whether the corresponding LLM element schema has a leaf reference. If the corresponding LLM element schema has a leaf reference, translation module 28 obtains a "referred path" from the leaf reference and obtains the corresponding element that is referred to. Translation module 28 then adds the parent of the referred-to object as a child of the corresponding LLM element schema.

An example set of low-level configuration information for a firewall is shown below:

```
<configuration>
  <firewall>
    <family>
      <ccc>
        <filter>
          <name>{name}</name>
          <interface-specific>
          <term>
            <name>rule1<lname>
          </term>
        </filter>
      </ccc>
    </family>
  </firewall>
  <interfaces>
    <interface>
      <name>{interface/name}</name>
      <unit>
        <name> (unit-id)</name>
        <family>
          <ccc>
            <filter>
              <input>{name}</input>
            </filter>
          </ccc>
        </family>
      </unit>
    </interface>
  </interfaces>
</configuration>
```

In the example low-level configuration information above, within the "interfaces" element is an interface having a unit with a family→ccc→filter including an "input" having a "name" value that refers to the "name" element of a filter in the "firewall" element (which includes the name in the family→ccc→filter element). That is, the italicized text "<input>{name}</input>" is a reference to the bolded text "<name>{name}</name>." Thus, the italicized text (i.e., the interfaces→interface→unit→family→ccc→filter→input element) is a leaf reference to the bold text (i.e., the firewall→family→ccc→filter→name element).

Accordingly, to resolve the leaf reference, translation module 28 constructs the following data:

```
<configuration>
  <interfaces>
    <interface>
      <name>{interface/name}</name>
      <unit>
        <name>{unit-id}</name>
        <family>
          <ccc>
            <filter>
              <name>{name}</name>
              <interface-specific>
              <term>
                <name>rule1<name>
              </term>
            </filter>
          </ccc>
        </family>
      </unit>
    </interface>
  </interfaces>
</configuration>
```

In this example, the bold-and-italicized text replaces the italicized text of the example above, such that the "firewall" element can be removed to resolve the reference.

After resolving the references, translation module 28 may build the dependency map. Translation module 28 may build the dependency map to include dependencies across elements within the high-level configuration model. Based on the translation function, translation module 28 may infer dependencies across high-level configuration model elements that correspond to the low-level configuration information elements.

An example of a translation function is shown below:

```
<configuration>
  <firewall>
    <policer>
      <name>{interface/name}</name>
      <if-exceeding>
        <bandwidth-limit>{/service/bandwidth-settings/bandwidth-
          limit}</bandwidth-limit>
        <burst-size-limit>{/service/bandwidth-settings/burstsize-
          limit}</burst-size-limit>
      </if-exceeding>
      <then>
        <discard/>
      </then>
    </policer>
  </firewall>
</configuration >
```

An example dependency map for this translation function is:

'interface/name': Set((['/service/bandwidth-settings/bandwidth-limit', '/service/bandwidth-settings/burstsize-limit'])

Based on this dependency map, when there is a change in bandwidth-limit or burstsize-limit in the high-level configuration information between existing high-level configuration information and new high-level configuration information, translation module 28 would generate the difference data between the existing and new high-level configuration information to include the 'interface/name' element as well.

Thus, translation module 28 may be configured according to the following pseudocode:

For every child in Translator template
  If child is leaf
    If child is key in Device configuration schema
      Add the child "referred service path" as key to dependencyMap
      Add the child "referred service path" as dependent to its parent node "referred servicePath"
    Else if child path is list
      Get the "Service path" corresponding to its list key element
      Add the child "referred service path" as dependent to its parent node "referred servicePath"
      Updlate dependency Map with "referred service path" as key
    Follow this recursively.

An example resulting dependency map, for the example translation function below, is shown below the translation function below:
Translation Function:

```
<template>
  <device>
    <device-id>{/service/devices/device/device-id}</device-id>
    <configuration>
      <interfaces loop-contex="interface">
        <interface>
          <name>{name}</name>
          <flexible-vlan-tagging/>
          <mtu>{/service/connectivity-settings/mtu}</mtu>
          <encapsulation>{/service/connectivity-settings/physical-if-
            encapsulation}</encapsulation>
        </interface>
      </interfaces>
      <protocols>
        <l2circuit>
          <neighbor>
            <name>{neighbour-name}</name>
            <interface loop-context="interface">
              <name>{name}</name>
              <virtual-circuit-id>{/service/connectivity-settings/vc
                id}</virtual-circuit-id>
              <no-control-word/>
              <ignore-encapsulation-mismatch/>
            </interface>
          </neighbor>
        </l2circuit>
      </protocols>
    </configuration>
  </device>
</template>
```
Dependency Map:
'interface/name': ['/service/connectivity-settings/mtu',
    '/service/connectivity-settings/physical-if-encapsulation']
'neighbour-name' : ['interface/name',' /service/connectivity-settings/vc-id']
'/service/devices/device/device-id':['interface/name', 'neighbour-name']

Translator module 28 may then perform the following to determine differences between the high-level configuration information, using the dependency map. Translator module 28 may generate two outputs (e.g., XML outputs) using the following technique: a create/update XML, which contains all added or updated nodes (in the new high-level configuration information relative to the existing high-level configuration information), and delete XML, which contains deleted nodes (in the new high-level configuration information relative to the existing high-level configuration information). These data sets may be inline with the service schema.

As part of the transformation, translation module 28 may first translate the delete XML, so that all of the deleted nodes are translated into low-level configuration information (for removal from existing low-level configuration information). After that, translation module 28 may translate the create/update XML, so that new low-level configuration information can be generated and added to existing low-level configuration information and updated low-level configuration information can be updated in the existing low-level configuration information. Pseudocode for the translation processes (that is, the function "GenerateDependencyDiff," which accepts three arguments: an existing high-level configuration (V1), a new high-level configuration (V2), and a dependency map as discussed above).

Function GenerateDependencyDiff(Element v1, Element v2, dependencyMap)
  The steps below may be performed to generate "create xml"
    Find the elements present in V2 but not in V1
    Mark these elements for create
    Get the "dependent elements" for these created elements based on dependency Map.
    Remove all other elements from V2.
    V2 config xml would be "create xml"
  The steps below may be performed to generate "delete xml"
    Find the elements present in V1 but not in V2
    Mark these elements for delete
    Get the "dependent elements" for these deleted elements based on dependency Map.
    Remove all other elements from V1.
    V1 xml would be the "delete xml"

The pseudocode above may be used in the case of a "PUT" scenario, in which the entire low-level configuration information is replaced. In the case of a "patch," based on the replaced parts, the dependency elements may be additionally included in the difference data.

Examples of translations according to these techniques are shown below.

Example Translation 1

For Example Translation 1, assume that the existing high-level configuration is the following (labeled "version 0" or "V0"):
Version 0:

```
<name>p2p1</name>
  <connectivity-settings>
    <vc-id>1234</vc-id>
    <mtu>1522</mtu>
    <physical-if-encapsulation>flexible-ethernet-services
    </physical-if-encapsulation>
  </connectivity-settings>
  <bandwidth-settings>
    <bandwidth-limit>1234</bandwidth-limit>
    <burstsize-limit>16745</burstsize-limit>
  </bandwidth-settings>
  <devices>
    <device>
      <device-id>10.1.1.1</device-id>
      <neighbour-name>14.1.1.1</neighbour-name>
      <interface>
        <name>ge-0/0/1</name>
      </interface>
      <interface>
        <name>ge-0/0/12</name>
      </interface>
    </device>
  </devices>
</name>
```

For Example Translation 1, assume that the new high-layer configuration is as shown below (labeled Version 1, with changes shown in italics):
Version 1:

```
<name>p2p1</name>
  <connectivity-settings>
    <vc-id>1234</vc-id>
    <mtu>2122</mtu>
    <physical-if-encapsulation>flexible-ethernet-
    services</physical-if-encapsulation>
  </connectivity-settings>
  <bandwidth-settings>
    <bandwidth-limit>1234</bandwidth-limit>
    <burstsize-limit>16745</burstsize-limit>
  </bandwidth-settings>
  <devices>
    <device>
      <device-id>10.1.1.1</device-id>
      <neighbour-name>14.1.1.1</neighbour-name>
      <interface>
        <name>ge-0/0/1</name>
      </interface>
      <interface>
        <name>ge-0/0/12</name>
      </interface>
    </device>
  </devices>
</name>
```

In this example (Example Transformation 1), transform module 28 would generate the following difference information:

```
<service xmlns="http:www.exampe.com/ns/ncs"
  xmlns:svc="http:www.example.com/ns/ncs">
  <name>p2p1</name>
```

```
  <connectivity-settings>
    <mtu nc:operation="update">2122<mtu>
  </connectivity-settings>
  <devices>
    <device>
      <device-id>10.1.1.1</device-id>
      <interface>
        <name>ge-0/0/1</name>
      </interface>
      <interface>
        <name>ge-0/0/12</name>
      </interface>
    </device>
  </devices>
</service>
```

In the Example Transformation 1, there is no difference in the interface details. The only difference in Version 1 is that the value for element <mtu> has changed from 1522 (Version 0) to 2122 (Version 1). Nevertheless, in accordance with the techniques of this disclosure, translation module 28 may still generate the create/update XML difference to include the "interface" details, because the <mtu> element is dependent on 'interface/name'. Because there are no deletions in Version 1 relative to Version 0, the delete XML is empty.

Example Transformation 2

For Example Translation 2, assume that the existing high-level configuration is the following (labeled "Version 0"):
Version 0:

```
<name>p2p1</name>
  <connectivity-settings>
    <vc-id>1234</vc-id>
    <mtu>2122</mtu>
    <physical-if-encapsulation>flexible-ethernet-
    services</physical-if-encapsulation>
  </connectivity-settings>
  <bandwidth-settings>
    <bandwidth-limit>1234</bandwidth-limit>
    <burstsize-limit>16745</burstsize-limit>
  </./bandwidth-settings>
  <devices>
    <device>
      <device-id>10.1.1.1</device-id>
      <neighbour-name>14.1.1.1</neighbour-name>
      <interface>
        <name>ge-0/0/1</name>
      </interface>
      <interface>
        <name>ge-0/0/12</name>
      </interface>
    </device>
  </devices>
</name>
```

For Example Translation 1, assume that the new high-layer configuration is as shown below (labeled Version 1, with changes shown in italics):
Version 1:

```
<name>p2p1</name>
  <connectivity-settings>
    <vc-id>1234</vc-id>
    <mtu>122</mtu>
    <physical-if-encapsulation>flexible-ethernet-
    services</physical-if-encapsulation>
```

```
      </connectivity-settings>
      <bandwidth-settings>
         <bandwidth-limit>1234</bandwidth-limit>
         <burstsize-limit>16745</burstsize-limit>
      </bandwidth-settings>
      <devices>
         <device>
            <device-id>10.1.1.1</device-id>
            <neighbour-name>17.1.1.1</neighbour-name>
            <interface>
               <name>ge-0/0/1</name>
            </interface>
            <interface>
               <name>ge-0/0/12</name>
            </interface>
         </device>
      </devices>
   </name>
```

In this example (Example Transformation 1), transform module 28 would generate the following difference information:

```
<service xmlns="http:www.example.com/ns/ncs"
    xmlns:svc="http:www.example.com/ns/ncs">
   <name>p2p1</name>
   <devices>
      <device>
         <device-id>10.1.1.1</device-id>
            <neighbour-name nc:operation="update">
              17.1.1.1</neighbour-name>
            <interface>
               <name>ge-0/0/1</name>
            </interface>
            <interface>
               <name>ge-0/0/12</name>
            </interface>
         </device>
      </devices>
   </service>
```

In the Example Transformation 2, although there is no difference in the interface details, the create/update XML would still include the interface details, because the "neighbour-name" element is dependent on 'interface/name'. That is, the update is effectively treated as a deletion of neighbour-name 14.1.1.1, and an addition of neighbour-name 17.1.1.1. Thus, the delete XML that translation module 28 would generate in this example is as follows:

```
<service xmlns="http:www.juniper.net/ns/ncs"
    xmlns:svc="hdp:www.juniper.net/ns/ncs">
   <name>p2p1</name>
   <devices>
      <device>
         <device-id>10.1.1.1</device-id>
         <neighbour-name nc:operation=
           "delete ">14.1.1.1</neighbour-name>
      </device>
   </devices>
</service>
```

Although there are no differences in device details, the device XML difference includes "neighbour-name" details, because "neighbour-name" is dependent on "devices/device/device-id."

Translation module 28 may further perform the following service transformation. In general, this includes translating an input service XML difference (that is, XML data describing differences between existing high-level configuration information and new high-level configuration information) into low-level configuration information. Translation module 28 may also take operational tags from the service XML difference data and add them appropriately, while generating the low-level configuration information. In one example, translation module 28 may operate according to the following pseudocode:

```
Function: Transform
For every child in Translator
   If the child has tag with "loop-context"
      Get the "Service elements" of loop-context path
      For every "Service element" call Transform recursively.
   If child is leaf
      Get the value & operation tag from diff, based on mapped path
      Create element with operation to target
   Else
      Call "Transform" with Child
      if child is added
         add current element.
```

Thus, in one example, the input (e.g., original configuration information or XML difference information) may be as follows:

```
<service>
   <name>p2p1</name>
   <connectivity-settings>
      <vc-id>1234</vc-id>
      <mtu>1522</mtu>
      <physical-if-encapsulation>flexible-
        ethernet-services</physical-if-encapsulation>
   </connectivity-settings>
   <bandwidth-settings>
      <bandwidth-limit>1234</bandwidth-limit>
      <burstsize-limit>16745</burstsize-limit>
   </bandwidth-settings>
   <devices>
      <device>
         <device-id>10.1.1.1</device-id>
         <neighbour-name>14.1.1.1</neighbour-name>
         <interface>
            <name>ge-0/0/1</name>
         </interface>
         <interface>
            <name>ge-0/0/12</name>
         </interface>
      </device>
   </devices>
</service>
```

The output from translation module 28 may be as follows: Create XML:

```
<configuration>
   <interfaces>
      <interface>
         <name>ge-0/0/1</name>
         <flexible-vlan-tagging/>
         <mtu>1522</mtu>
         <encapsulation>flexible-ethernet-
           services</encapsulation>
      </interface>
      <interface>
         <name>ge-0/0/12</name>
         <flexible-vlan-tagging/>
         <mtu>1522</mtu>
         <encapsulation>flexible-ethernet-
           services</encapsulation>
      </interface>
   </interfaces>
   <protocols>
      <l2circuit>
```

```
            <neighbor>
                <name>14.1.1.1</name>
                <interface>
                    <name>ge-0/0/1</name>
                    <virtual-circuit-id>1234</virtual-circuit-id>
                    <no-control-word/>
                    <ignore-encapsulation-mismatch/>
                </interface>
                <interface>
                    <name>ge-0/0/12</name>
                    <virtual-circuit-id>1234</virtual-circuit-id>
                    <no-control-word/>
                    <ignore-encapsulation-mismatch/>
                </interface>
            </neighbor>
        </l2circuit>
    </protocols>
</configuration>
```

As another example, to illustrate data being updated, the difference data may be as follows:

```
<service xmlns="http:www.example.com/ns/ncs"
    xmlns:svc="http:www.example.com/ns/ncs">
    <name>p2p1</name>
    <connectivity-settings>
        <mtu nc:operation="update">1234</mtu>
    </connectivity-settings>
    <devices>
        <device>
            <device-id>10.1.1.1</device-id>
            <interface>
                <name>ge-0/0/1</name>
            </interface>
            <interface>
                <name>ge-0/0/12</name>
            </interface>
        </device>
    </devices>
</service>
```

Translation module 28 may generate the following output from this input, in this example:

```
<configuration>
    <interfaces>
        <interface>
            <name>ge-0/0/1</name>
            <mtu nc:operation="update">1234</mtu>
        </interface>
        <interface>
            <name>ge-0/0/12</name>
            <mtu nc:operation="update">1234</mtu>
        </interface>
    </interfaces>
</configuration>
```

As yet another example, where data is deleted relative to the existing high-level configuration information, the input difference XML data may be as follows:

```
<service>
    <name nc:operation="delete ">p2p1</name>
    <connectivity-settings nc:operation=" delete ">
        <vc-id>1234</vc-id>
        <mtu>2122</mtu>
        <physical-if-encapsulation>flexible-ethernet-
            services</physical-if-encapsulation>
    </connectivity-settings>
    <bandwidth-seal ngs nc:operation=" delete ">
        <bandwidth-limit>1234<lbandwidth-limit>
```
```
        <burstsize-limit>l6745</burstsize-limit>
    </bandwidth-settings>
    <devices>
        <device nc:operation=" delete ">
            <device-id>10.1.1.1</device-id>
            <neighbour-name>1711.1</neighbour-name>
            <interface>
                <name>ge-010/1</name>
            </interface>
            <interface>
                <name>ge-0/0/12</name>
            </interface>
        </device>
    </devices>
</service>
```

The resulting output that translation module generates from this input may be as follows:

```
<configuration>
    <interfaces>
        <interface nc:operation="delete">
            <name>ge-0/0/1</name>
            <flexible-vlan-tagging/>
            <mtu>1522</mtu>
            <encapsulation>flexible-ethernet-services</encapsulation>
        </interface>
        <interface nc:operation="delete">
            <name>ge-0/0/12</name>
            <flexible-vlan-tagging/>
            <mtu>1522</mtu>
            <encapsulation>flexible-ethernet-services</encapsulation>
        </interface>
    </interfaces>
    <protocols>
        <l2circuit>
            <neighbor nc:operation="delete">
                <name>14.1.1.1</name>
                <interface>
                    <name>ge-0/0/1</name>
                    <virtual-circuit-id>1234</virtual-circuit-id>
                    <no-control-word/>
                    <ignore-encapsulation-mismatch/>
                </interface>
                <interface>
                    <name>ge-0/0/12</name>
                    <virtual-circuit-id>1234</virtual-circuit-id>
                    <no-control-wordl>
                    <ignore-encapsulation-mismatch/>
                </interface>
            </neighbor>
        </l2circuit>
    </protocols>
</configuration>
```

After receiving the low-level configuration instructions from translation module 28, configuration module 28 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrator 12 (FIG. 1) to interact with management device 10, it should be understood that other interfaces may be used in other examples. For example, management device 10 may include a representational state transfer (REST) client (not shown) that may act as an interface to another device, by which administrator 12 may configure management device 10. Likewise, administrator 12 may configure elements 14 by interacting with management device 10 through the REST client.

Figure 3:
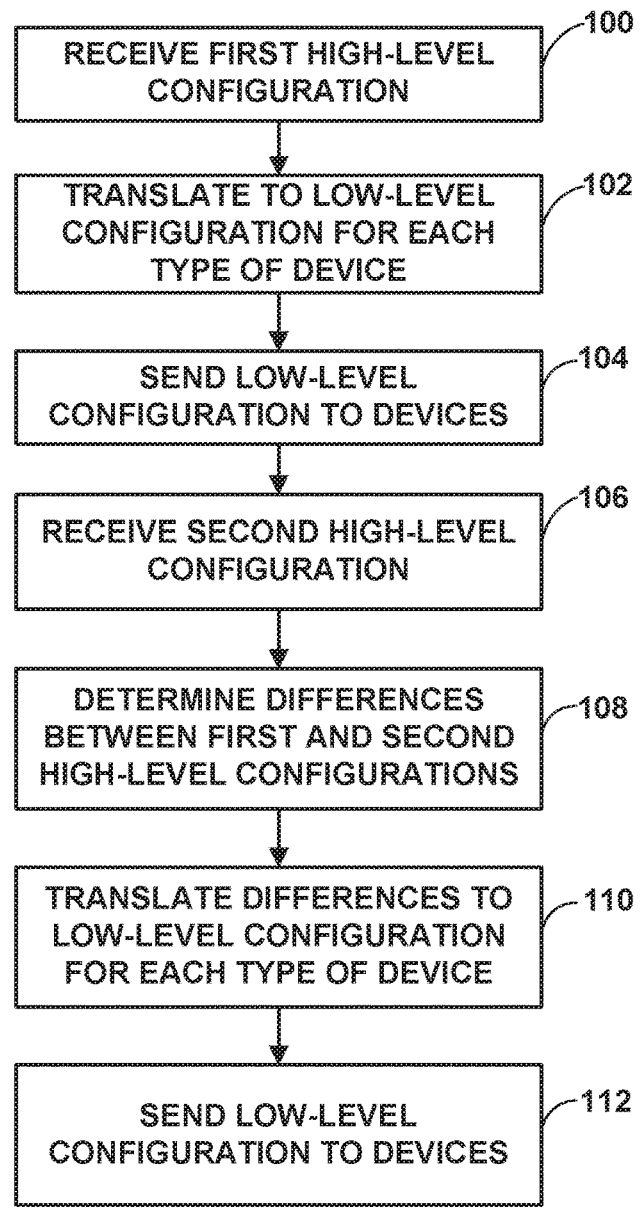
FIG. 3 is a flowchart illustrating an example method of configuring and reconfiguring managed devices in accordance with techniques of this disclosure.

FIG. 3 is a flowchart illustrating an example method of configuring and reconfiguring managed devices in accordance with techniques of this disclosure. The method of FIG. 3 is explained with respect to management device 10 (representing an example of a network management system (NMS) device) of FIGS. 1 and 2. However, it should be understood that other devices may be configured to perform this or a similar method.

In this example, initially, management device 10 receives a first high-level configuration (100), e.g., from administrator 12. In particular, administrator 12 may enter or submit data representing the first high-level configuration for a group of managed network devices, e.g., one or more of elements 14. In general, the group of managed network devices may include devices that serve the same or similar purposes (e.g., devices that perform the same or similar services) but are of different types, e.g., are provided by different vendors. In other examples, the devices need not serve the same or similar purposes, but may perform a common service. Administrator 12 may provide the first high-level configuration via user interface 36. User interface module 38 receives data representing the first high-level configuration via user interface 36 and provides the data to configuration module 26 of management module 24.

Configuration module 26 then provides the data representing the high-level configuration to translation module 28. Translation module 28 determines the types of the managed network devices to be configured with the high-level configuration information based on device database 40. Translation module 28 then selects appropriate translation functions from translation functions 30 to apply to the high-level configuration. For example, translation module 28 selects translation functions that are specifically designed for the types of devices (and/or services performed by the devices) to which the high-level configuration information is to be applied. Translation module 28 then applies the selected translation functions to the high-level configuration to generate separate sets of low-level configuration for each of the types of devices (and/or services performed by the devices), thereby translating the high-level configuration to low-level configuration for each type of device (102).

Translation module 28 then provides the sets of low-level configuration to configuration module 26, which uses device database 40 to determine which of elements 14 are to be configured using each of the sets of low-level configuration. Then, configuration module 26 configures the determined elements by sending the low-level configuration to the devices (104). Moreover, configuration module 26 may store the first high-level configuration to device database 40, along with data indicating which of elements 14 are configured according to the first high-level configuration.

Subsequently, management device 10 receives a second high-level configuration (106), which is different than the first high-level configuration. Again, configuration module 26 provides the second high-level configuration to translation module 28. In this case, translation module 28 determines differences between the first high-level configuration and the second high-level configuration (108). In particular, translation module 28 retrieves the first high-level configuration from device database 40 and compares the first and second high-level configurations to determine whether the elements of the second high-level configuration represent additions or modifications relative to the first high-level configuration, and whether any elements have been removed relative to the first high-level configuration. In some examples, translation module 28 generates a single set of data describing these differences, whereas in other examples, translation module 28 may generate separate sets of data describing additions, modifications, and/or removals.

In any case, translation module 28 then determines which of translation functions 30 to apply to the data describing the differences and then applies the determined translation functions to the data describing the differences, thereby translating the differences to low-level configuration for each type of device (110). That is, again, translation module 28 selects different translation functions based on types for the devices, e.g., vendors that provided the devices. In some examples, translation module 28 may select different translation functions for each type of difference data, e.g., additions, modifications, and/or removals. Translation module 28 generates separate sets of low-level configuration information for the corresponding elements of elements 14 and provides the sets of low-level configuration information to configuration module 26. Translation module 28 also updates device database 40 to store the second high-level configuration for these elements.

Configuration module 26 then sends the low-level configuration to the devices (112). In particular, configuration module 26 sends instructions to the devices according to each device type that cause the devices to conform to the appropriate low-level configuration. For example, configuration module 26 may submit commands to the devices to add, modify, or remove low-level configuration values, according to the manner in which these devices are to be configured (e.g., based on vendor-specific configuration mechanisms). Such commands may comprise, for example, command-line interface (CLI) commands that would otherwise be manually entered by a user to configure the devices.

Figure 4:
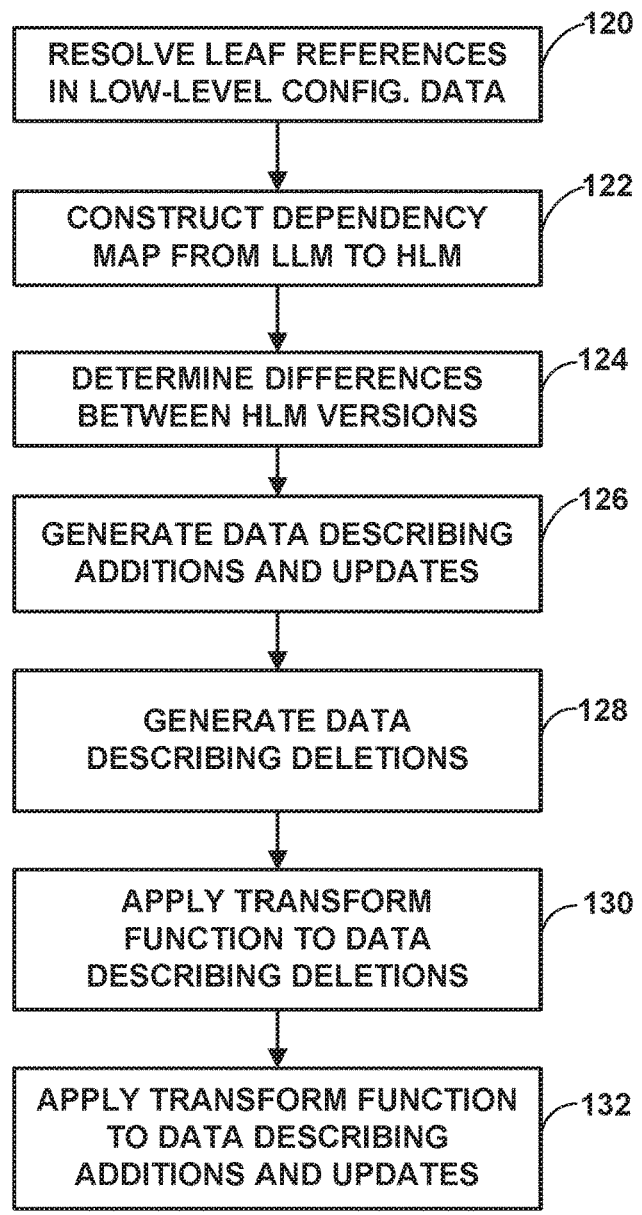
FIG. 4 is a flowchart illustrating an example method for constructing difference data between different versions of high-level configuration and translating the difference data in accordance with techniques of this disclosure.

FIG. 4 is a flowchart illustrating an example method for constructing difference data between different versions of high-level configuration and translating the difference data in accordance with techniques of this disclosure. The method of FIG. 4 may generally correspond to steps 108 and 110 of the method of FIG. 3. However, it should be understood that the techniques of FIG. 4 need not necessarily be used in conjunction with the techniques of FIG. 3. For example, the techniques described with respect to FIG. 4 may be used for all managed devices, and may (but need not necessarily be) applied separately to different types of devices, e.g., devices provided by different vendors. Again for purposes of example and explanation, the method of FIG. 4 is explained with respect to management device 10.

It is assumed, for purposes of the method of FIG. 4, that management device 10 has previously received a set of high-level configuration information (also referred to as a high-level model or "HLM"). It is also assumed that management device 10 has generated one or more sets of low-level configuration (also referred to as low-level model or "LLM") for devices managed using the high-level configuration information. It is further assumed that management device 10 has received a new set of high-level configuration information to be applied to the managed devices (e.g., one or more of elements 14). For purposes of example and explanation, the method of FIG. 4 is described with respect to a single type of device to be configured (e.g., one or more devices available from a common vendor). It should be understood that the method of FIG. 4 could be repeated for other types of devices, e.g., devices available from other vendors.

Initially, in the example of FIG. 4, translation module 28 resolves leaf references in the existing low-level configuration data (120). Translation module 28 may, for each element in the corresponding translation function (also referred to as "templateXML"), determine whether the corresponding LLM element schema has a leaf reference. If the corresponding LLM element schema has a leaf reference, translation module 28 obtains a "referred path" from the leaf reference and obtains the corresponding element that is referred to. Translation module 28 then adds the parent of the referred-to object as a child of the corresponding LLM element schema.

Translation module 28 then constructs data describing a dependency map representing dependencies from the LLM to the HLM (122). Translation module 28 may build the dependency map to include dependencies across elements within the high-level configuration information. Based on the translation function, translation module 28 may infer dependencies across high-level configuration model elements that correspond to the low-level configuration information elements. Steps 120 and 122 as shown may be performed only when the method of FIG. 4 is initially performed. In subsequent iterations, steps 120 and 122 may be omitted, and the method of FIG. 4 may be performed starting with step 124 as discussed below.

Translation module 28 then determines differences between the HLM versions (124), that is, the existing HLM and the new HLM. Translator module 28 may generate two outputs (e.g., XML outputs) using the following technique: a create/update XML, which contains all added or updated nodes (in the new high-level configuration information relative to the existing high-level configuration information) (126), and delete XML, which contains deleted nodes (in the new high-level configuration information relative to the existing high-level configuration information) (128). In this example, these data sets are inline with the service schema.

Translation module 28 may then apply a transform function to the data describing the deletions (130), e.g., the delete XML. In some examples, translation module 28 applies the same translation function to both the data describing the additions and updates, and to the data describing the deletions. Translation module 28 may also apply a transform function to the data describing the additions and updates (132), e.g., the create/update XML discussed above.

Although not shown in the example of FIG. 4, it should be understood that applying the transform functions to the data describing the additions and updates, and to the data describing the deletions, the result is translated data describing changes to be made to the existing low-level configuration, i.e., the LLM. Translation module 28 may provide this data to configuration module 26, which may configure the managed devices according to these changes. In this manner, the method of FIG. 4 may be used to configure managed devices in response to receiving new high-level configuration information.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising, by a network management system (NMS) device that manages a plurality of network devices, including a first network device and a second network device configured according to a first high-level configuration:
   receiving a second high-level configuration for at least the first network device and the second network device;
   determining a difference between the first high-level configuration and the second high-level configuration;
   applying a first transformation function, specific to the first network device, to the difference between the first high-level configuration and the second high-level configuration to generate a first low-level configuration change specific to the first device;
   applying a second transformation function, specific to the second network device, to the difference between the first high-level configuration and the second high-level configuration to generate a second low-level configuration change specific to the second device;
   configuring the first device with the first low-level configuration change; and
   configuring the second device with the second low-level configuration change.

2. The method of claim 1, wherein determining the difference comprises:
   determining dependencies between elements in the first high-level configuration and a low-level configuration model that is based on the first high-level configuration for at least one of the first device or the second device; and
   generating data describing the differences and the dependencies.

3. The method of claim 2, wherein determining the dependencies comprises:
   determining a child leaf element in a translator function that is executed to translate the first high-level configuration into the low-level configuration model;
   when the child leaf element is a key element of the low-level configuration model, adding the child to the data describing the dependencies and data describing the child as dependent to a parent element of the child leaf element to the data describing the dependencies; and
   when the child leaf element is a list of sub-elements, determining a service path corresponding to a list key element for the child leaf element, adding the child leaf element as dependent to the parent leaf element of the child leaf element to the data describing the dependencies and updating the data describing the dependencies to use the list key element as a key element for the child leaf element.

4. The method of claim 2,
   wherein generating the data describing the differences comprises generating a first set of data describing additions and updates, and a second set of data describing deletions;
   wherein applying the first transformation function comprises:
      applying the first transformation function to the second set of data to generate data describing deletions from the low-level configuration; and
      applying the first transformation function to the first set of data to generate data describing additions and updates to the low-level configuration; and
   wherein configuring the first device comprises applying the data describing the additions and the updates to the first device, and the data describing the deletions to the first device.

5. The method of claim 1,
   wherein configuring the first device comprises sending first command-line interface instructions to the first device according to the first low-level configuration change, and
   wherein configuring the second device comprises sending second command-line interface instructions to the second device according to the second low-level configuration change.

6. The method of claim 1, wherein the first network device is provided by a first vendor, and wherein the second network device is provided by a second, different vendor.

7. A network management system (NMS) device that manages a plurality of network devices, including a first network device and a second network device configured according to a first high-level configuration, the NMS device comprising:
   an interface configured to receive a second high-level configuration for at least the first network device and the second network device;
   one or more network interfaces communicatively coupled to the plurality of network devices; and
   one or more hardware-based processors, implemented using discrete logic circuitry, configured to:
      determine a difference between the first high-level configuration and the second high-level configuration;
      apply a first transformation function, specific to the first network device, to the difference between the first high-level configuration and the second high-level configuration to generate a first low-level configuration change specific to the first device;
      apply a second transformation function, specific to the second network device, to the difference between the first high-level configuration and the second high-level configuration to generate a second low-level configuration change specific to the second device;
      configure the first device with the first low-level configuration change via the one or more network interfaces; and
      configure the second device with the second low-level configuration change via the one or more network interfaces.

8. The NMS device of claim 7, wherein to determine the difference, the one or more processors are configured to:
   determine dependencies between elements in the first high-level configuration and a low-level configuration model for at least one of the first device or the second device; and
   generate data describing the differences and the dependencies.

9. The NMS device of claim 8, wherein to determine the dependencies, the one or more processors are configured to:
   determine a child leaf element in a translator function that is executed to translate the first high-level configuration into the low-level configuration model;
   when the child leaf element is a key element of the low-level configuration model add the child to the data describing the dependencies and data describing the child as dependent to a parent element of the child leaf element to the data describing the dependencies; and
   when the child leaf element is a list of sub-elements, determine a service path corresponding to a list key element for the child leaf element, add the child leaf element as dependent to the parent leaf element of the child leaf element to the data describing the dependencies and update the data describing the dependencies to use the list key element as a key element for the child leaf element.

10. The NMS device of claim 8,
    wherein to generate the data describing the differences, the one or more processors are configured to generate a first set of data describing additions and updates, and a second set of data describing deletions;
    wherein to apply the first transformation function, the one or more processors are configured to:
       apply the first transformation function to the second set of data to generate data describing deletions from the low-level configuration; and
       apply the first transformation function to the first set of data to generate data describing additions and updates to the low-level configuration; and
    wherein to configure the first device, the one or more processors are configured to apply the data describing the additions and the updates to the first device, and the data describing the deletions to the first device.

11. The NMS device of claim 7,
    wherein to configure the first device, the one or more processors are configured to send first command-line interface instructions to the first device according to the first low-level configuration change, and
    wherein to configure the second device, the one or more processors are configured to send second command-line interface instructions to the second device according to the second low-level configuration change.

12. The NMS device of claim 7, wherein the first network device is provided by a first vendor, and wherein the second network device is provided by a second, different vendor.

13. A system comprising:
a plurality of network devices; and
a network management system (NMS) device that manages the plurality of network devices, including a first network device and a second network device configured according to a first high-level configuration, the NMS device comprising:
an interface configured to receive a second high-level configuration for at least the first network device and the second network device;
one or more network interfaces communicatively coupled to the plurality of network devices; and
one or more hardware-based processors, implemented using discrete logic circuitry, configured to:
determine a difference between the first high-level configuration and the second high-level configuration;
apply a first transformation function, specific to the first network device, to the difference between the first high-level configuration and the second high-level configuration to generate a first low-level configuration change specific to the first device;
apply a second transformation function, specific to the second network device, to the difference between the first high-level configuration and the second high-level configuration to generate a second low-level configuration change specific to the second device;
configure the first device with the first low-level configuration change via the one or more network interfaces; and
configure the second device with the second low-level configuration change via the one or more network interfaces.

14. A computer-readable storage medium comprising instructions that, when executed, cause a processor of a network management system (NMS) device that manages a plurality of network devices, including a first network device and a second network device configured according to a first high-level configuration, to:
receive a second high-level configuration for at least the first network device and the second network device;
determine a difference between the first high-level configuration and the second high-level configuration;
apply a first transformation function, specific to the first network device, to the difference between the first high-level configuration and the second high-level configuration to generate a first low-level configuration change specific to the first device;
apply a second transformation function, specific to the second network device, to the difference between the first high-level configuration and the second high-level configuration to generate a second low-level configuration change specific to the second device;
configure the first device with the first low-level configuration change; and
configure the second device with the second low-level configuration change.

15. The computer-readable storage medium of claim 14, wherein the instructions that cause the processor to determine the difference comprise instructions that cause the processor to:

determine dependencies between elements in the first high-level configuration and a low-level configuration model that is based on the first high-level configuration for at least one of the first device or the second device; and
generate data describing the differences and the dependencies.

16. The computer-readable storage medium of claim 15, wherein the instructions that cause the processor to determine the dependencies comprise instructions that cause the processor to:
determine a child leaf element in a translator function that is executed to translate the first high-level configuration into the low-level configuration model;
when the child leaf element is a key element of the low-level configuration model add the child to the data describing the dependencies and data describing the child as dependent to a parent element of the child leaf element to the data describing the dependencies; and
when the child leaf element is a list of sub-elements, determine a service path corresponding to a list key element for the child leaf element, adding the child leaf element as dependent to the parent leaf element of the child leaf element to the data describing the dependencies and updating the data describing the dependencies to use the list key element as a key element for the child leaf element.

17. The computer-readable storage medium of claim 15, wherein the instructions that cause the processor to generate the data describing the differences comprise instructions that cause the processor to generate a first set of data describing additions and updates, and a second set of data describing deletions;
wherein the instructions that cause the processor to apply the first transformation function comprise instructions that cause the processor to:
apply the first transformation function to the second set of data to generate data describing deletions from the low-level configuration; and
apply the first transformation function to the first set of data to generate data describing additions and updates to the low-level configuration; and
wherein the instructions that cause the processor to configure the first device comprise instructions that cause the processor to apply the data describing the additions and the updates to the first device, and the data describing the deletions, to the first device.

18. The computer-readable storage medium of claim 14, wherein the instructions that cause the processor to configure the first device comprise instructions that cause the processor to send first command-line interface instructions to the first device according to the first low-level configuration change, and
wherein the instructions that cause the processor to configure the second device comprise instructions that cause the processor to send second command-line interface instructions to the second device according to the second low-level configuration change.

19. The computer-readable storage medium of claim 14, wherein the first network device is provided by a first vendor, and wherein the second network device is provided by a second, different vendor.

* * * * *